US006721439B1

(12) United States Patent
Levy et al.

(10) Patent No.: US 6,721,439 B1
(45) Date of Patent: Apr. 13, 2004

(54) METHOD AND SYSTEM OF WATERMARKING DIGITAL DATA USING SCALED BIN ENCODING AND MAXIMUM LIKELIHOOD DECODING

(75) Inventors: Avraham Levy, Kiryat-Tivon (IL); Neri Merhav, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 563 days.

(21) Appl. No.: 09/642,223

(22) Filed: Aug. 18, 2000

(51) Int. Cl.$^7$ ................................................ G06K 9/00
(52) U.S. Cl. ...................................................... 382/100
(58) Field of Search .................... 382/100; 713/176; 358/3.28

(56) References Cited

U.S. PATENT DOCUMENTS

| | | | | |
|---|---|---|---|---|
| 4,939,515 A | * | 7/1990 | Adelson | 341/51 |
| 5,848,155 A | * | 12/1998 | Cox | 382/191 |
| 5,915,027 A | * | 6/1999 | Cox et al. | 380/54 |
| 6,208,735 B1 | * | 3/2001 | Cox et al. | 380/54 |
| 6,332,030 B1 | * | 12/2001 | Manjunath et al. | 382/100 |
| 6,523,114 B1 | * | 2/2003 | Barton | 713/176 |

FOREIGN PATENT DOCUMENTS

| | | | |
|---|---|---|---|
| EP | 0845758 A | | 6/1998 |
| EP | 0 845 758 | * | 6/1998 |

OTHER PUBLICATIONS

Hernandez et al., "Novel Techniques for Watermark Extraction in the DCT Domain," Jun. 1999, Workshop on Nonlinear Signal and Image Processing.*

Barn et al., "Robust Watermarking of Still Imaged for Copyright Protection," 1977, IEEE, 499–502.*

M. Barni, et al., "Robust Watermarking of Still Images for Copyright Protection", Digital Signal Processing Proceedings, 1997; pp. 499–502.

Brian Chen, et al.; "Quantization Index Modulation: A Class of Provably Good Methods for Digital Watermarking and Information Embedding"; ISIT2000, Sorrento, Italy, Jun. 25–30, 2000; pp. 1–2.

Brian Chen, et al.; "Dither Modulation: A new approach to digital watermarking and information embedding"; January 1999; Proceedings of SPIE, vol. 3657, pp. 342–353.

Max H.M. Costa; "Writing on Dirty Paper"; IEEE Transactions on Information Theory; May 1983; vol. IT–29, No. 3; pp. 439–441.

Scott Craver, et al.; "Resolving Rightful Ownerships with Invisible Watermarking Techniques: Limitations, Attacks, and Implications"; IEEE Journal on Selected Areas in Communications; May 1998; vol. 16, No. 4; pp. 573–586.

* cited by examiner

Primary Examiner—Leo Boudreau
Assistant Examiner—Shefali Patel (57) ABSTRACT

A transform domain watermarking technique which is based on a new encoding scheme referred to as scaled bin encoding which encodes a message in a set of transform coefficients by modifying their values in a way that preserves high image quality (i.e., low distortion levels) and adapts to expected noise level. Recapturing of the watermark image is performed via a decoding method using a maximum likelihood procedure (i.e., maximum likelihood decoding), based on the statistics of the transform coefficients and a worst case statistical model of the noise introduced to these coefficients by image processing operations or attack noise.

14 Claims, 9 Drawing Sheets

METHOD AND SYSTEM OF WATERMARKING DIGITAL DATA USING SCALED BIN ENCODING AND MAXIMUM LIKELIHOOD DECODING

FIELD OF THE INVENTION

The present invention relates to watermarking of digital data and in particular to the technique of embedding watermark data into digital image data and recapturing the embedded watermark data from a noisy version of the watermarked digital image without the use of the original digital image data.

BACKGROUND OF THE INVENTION

The fast development of digital information technology, combined with the simplicity of duplication and distribution of digital data across communication networks like the Internet (using, e.g., publicly accessible web sites), has exposed content providers to a real challenge of how to protect their electronic data (e.g., images, video, sound, text). This has stimulated many research efforts towards the design and study of sophisticated watermarking and information hiding methodologies for copyright protection.

Watermarking techniques are used to embed secret information into, for instance, an image in such a way that this information cannot be removed or deciphered without access to a secret key. On the other hand, to maintain quality, the watermarked image needs to be perceptually identical once the watermark is embedded into the original image.

The main application of watermarking is for proving ownership of the data and for protection against forgers. It is therefore crucial to ensure that no malicious attacker is able to remove the watermark without damaging the image to the degree that it becomes useless. In addition watermarking techniques need to be robust to standard operations performed on images, like printing, scanning, lossy compression (e.g., JPEG), filtering, and so on.

Hence, the tradeoffs to be considered in the design of a watermarking technique rely on three principal parameters: robustness to attacks and image processing operations, high quality, and the relative amount of secret information to be embedded, i.e., the coding rate.

Prior art image watermarking techniques can be divided into two groups according to the type of feature set the watermark is embedded in. Specifically, the watermark is embedded into either the intensity value of the luminance in the spatial domain representation of the image or the transform coefficients in the transform domain representation (e.g. DCT, DWT) of the image. The algorithms that are used to detect the watermark signal can also be placed under two categories based on whether or not they use the original image during the watermark detection process. In general, watermarking techniques that embed the watermark in the coefficients of a transform domain and detect it without resorting to the original image enjoy many advantages in their robustness to standard image processing operations and to hostile attacks.

The basic technique for embedding a watermark message or data into an image I by encoding the watermark data within the transform domain is performed by initially transforming the image I to obtain a representation in a transform domain (e.g. DCT, DFT etc) of the image. Next, a sub-set of the transform coefficients is selected and the watermark message is encoded by slightly changing the sub-set of transform coefficients values, thus producing a watermarked transform coefficient set. The watermarked coefficients are then combined with the non-watermarked coefficients to generate a watermark embedded transform representation of the image. The watermarked transform representation is then inverse-transformed to produce a watermarked image $\tilde{I}$. The coefficient modification is subtle enough so that $\tilde{I}$ is perceptually indistinguishable from the original image I.

In order to recapture the watermark from the watermarked image $\tilde{I}$ a decoder receives the distorted or noisy version of $\tilde{I}$, that may have suffered certain image processing operations or hostile attacks. It transforms the received version to the appropriate transform domain representation and selects the same sub-set of coefficients in which the watermark signal has been encoded. The decoder then extracts the watermark message from the sub-set of coefficients using a decoding procedure.

Recently, two methods for watermarking in a transform domain have been suggested for decoding without resorting to the original image: coefficient perturbation and dithering modulation.

In one prior art method using coefficient perturbation, the watermark data is added to the original image by perturbing the values of significant DCT (i.e., transform) coefficients. For example, if s is a DCT coefficient, a "zero" bit of the watermark data is encoded by changing the coefficient to s+$\epsilon$ and a "one" bit of the watermark data is encoded by changing the coefficient to s−$\epsilon$, where $\epsilon$ is a small constant. Recapturing the watermark message from the watermarked image $\tilde{I}$ is accomplished by correlating the appropriate DCT coefficients with the watermark message. Variations of this watermarking technique have been suggested such as the use of different transform domains such as DFT or DWT and/or the use of different perturbation schemes (e.g., s(1±$\epsilon$) or s±$\epsilon$|s|).

Dithering modulation is based on quantizing the transform domain coefficients. In this case, embedding a watermark message in a selected sub-set of coefficients is based on replacing these coefficients with their quantized values in a way that depends on the watermark message. For example, a "zero" bit is encoded by quantizing the coefficients with a quantizer $q_0$ and a "one" bit is encoded by quantizing the coefficients with a different quantizer $q_1$.

In a variation of the dither modulation watermarking scheme "zero" bit and "one" bit values are encoded using two "self-noise suppression" mappings $f_0$ and $f_1$ which are based on a small modification of the quatizer mappings $q_0$ and $q_1$ used in the dither modulation scheme.

To date, the prior art watermarking schemes including coefficient perturbation and dither modulation are not explicitly designed to adapt to a predefined distortion level or noise criteria. As a result, they provide a relatively low rate of information embedding or suffer from high error rate under changing noise conditions. More importantly, since attempts by malicious attackers take the form of unknown noise conditions on the watermark embedded image data, these prior art schemes are less able to protect against attacks upon the security of the data—one of the main purposes of watermarking.

The present invention presents a watermarking technique which is based on a new encoding scheme referred to as scaled bin encoding which encodes watermark data into image data by modifying image values in a way that preserves high image quality (i.e., low distortion levels) and adapts to expected (i.e., worse case) noise level. Recapturing of the watermark data from the watermark embedded image after it has been exposed to unintentional and/or intentional noise is performed via a decoding method using a probability based procedure (e.g., maximum likelihood decoding), based on estimated statistics of the original image values and an expected statistical model of the noise introduced to the image by image processing operations or attack noise, thereby providing a robust and high quality watermarking system and method.

SUMMARY OF THE INVENTION

The present invention provides a method and system of embedding digital watermark data into digital image data and recapturing the embedded watermark from the watermarked digital data without the use of the original digital image data and despite noise introduced into the watermarked digital image data. The system and method of the present invention is performed by two processes: the process of embedding the watermark into the original digital data to obtain watermarked digital data and the process of decoding the watermarked digital data to obtain the original watermarked data. Watermark data is embedded into the digital image data using an encoding method referred to as scaled bin encoding. The embedded watermark data is recaptured from the watermarked data using a probability based decoding scheme. In one embodiment, the probability based decoding scheme is the Maximum Likelihood (ML) decoding scheme.

In one embodiment, embedding of the watermarked data is achieved by transforming the original digital image data into first transform coefficients; encoding the watermark data using an error correcting code; embedding the encoded watermark data into a first sub-set of the first transform coefficients to generate a sub-set of embedded transform coefficients using scaled bin encoding; and then inversely transforming the watermark embedded first sub-set of coefficients along with the remaining non-watermark embedded first transform coefficients to generate watermark embedded digital image data which includes the original digital image data and the watermark data According to this embodiment, scaled bin encoding is performed by scaling each coefficient of the sub-set of transform coefficients with a predetermined scaling parameter which is representative of an expected noise level and an allowed distortion model; mapping each scaled coefficient to one of a pair of skewed discrete mappings dependent on the logic state of the corresponding encoded watermark data bit to be embedded into each scaled coefficient; obtaining a difference between each scaled coefficient from its corresponding mapped and scaled coefficient; and adding the difference to its corresponding original (i.e., unscaled and unmapped) coefficient to obtain each watermark embedded transform coefficient.

In accordance with another embodiment of the system and method of the present invention, the watermark data is recaptured from the watermark embedded digital image data by transforming the watermark embedded image into second transform coefficients using the same transformation as used during watermark encoding; selecting a second sub-set of watermarked transform coefficients which correspond to the first sub-set of transform coefficients; estimating statistical parameters of the first sub-set of transform coefficients using image statistics of the second watermarked sub-set of coefficients; extracting embedded watermark data from the second sub-set of coefficients with a probability based decoding scheme which uses the predetermined scaling parameter, known aspects of the scaling and mapping steps, the expected noise and allowed distortion model, and the estimated statistical parameters; decoding the extracted watermark data using an error correcting decoder based on the error correcting code used when watermark encoding to obtain an estimate of the original watermark. In one embodiment the ML decoding scheme is used as the probability type decoding scheme.

For embedding the watermark into the digital image data, one embodiment of the system of watermarking includes an image transformer for transforming the digital image data into a transform domain representation; an encoder for encoding watermark data using an error correcting code to generate encoded watermark data; a watermark encoder for embedding the encoded watermark data into a first sub-set of the first transform coefficients to generate a sub-set of embedded transform coefficients by using scaled bin encoding; an inverse image transformer for inversely transforming the watermark embedded first sub-set of coefficients along with the remaining non-watermark embedded first transform coefficients to generate watermarked digital image data which includes the digital image data and the watermark data.

For recapturing the watermark data from the watermarked image, one embodiment of the system of watermarking includes an image transformer for transforming the watermarked image data into the transform domain representation; a means for determining the statistical parameters of the second sub-set of coefficients; a probability based watermark decoder for extracting embedded watermark data from the second sub-set of coefficients with a probability based decoding scheme which uses the predetermined scaling parameter, known aspects of the scaling and mapping steps, the expected noise and allowed distortion model, and the estimated statistical parameters; a decoder for decoding the extracted watermark data using an error correcting decoder based on the original error correcting code to generate the watermark data.

BRIEF DESCRIPTION OF THE DRAWINGS

The objects, features, and advantages of the present invention will be apparent to one skilled in the art, in view of the following detailed description in which.

DETAILED DESCRIPTION OF THE INVENTION

Figure 1:
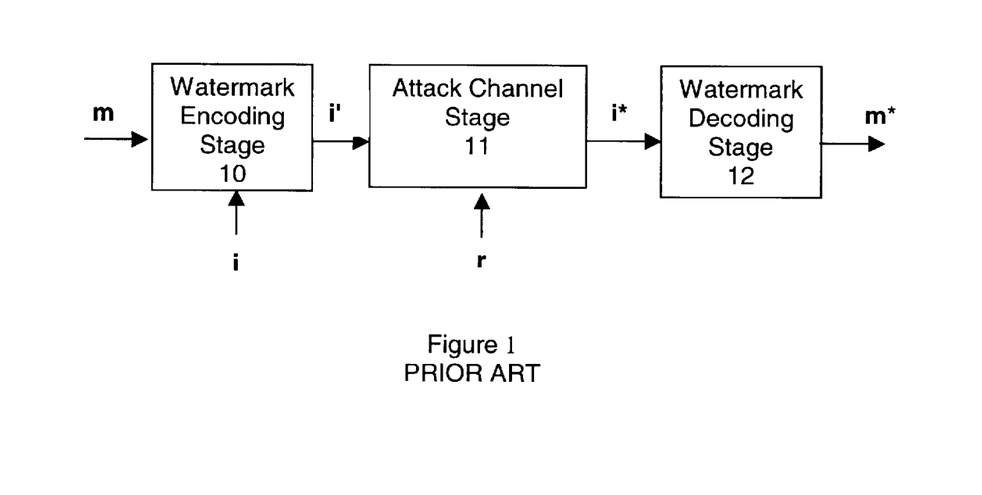
FIG. 1 illustrates basic stages of the watermarking process.

The watermarking process can be represented as having three stages: a watermark encoding stage 10, an attack channel stage 11, and a watermark decoding stage 12.

The encoding stage 10 receives two inputs: m—the watermark data or message to be embedded and i a covertext image where the watermark message is to be embedded. Covertext image i can include digital data comprising text data, video data, audio data or combinations of these types of data. The output of the encoder is a watermarked image i' that is perceptually similar to the original image i. The attack channel 11 represents a composition of expected and/or non-malicious signal processing operations (e.g. compression, filtering, etc.) and/or a deliberate attack on the watermarked image. The watermark embedded image output i* of the channel is a distorted version of the input watermark embedded image i', which is assumed to result from noise signal r. Finally, the decoder 12 receives the image i* as an input and estimates the embedded message m without resorting to the original covertext image i.

Figure 2A:
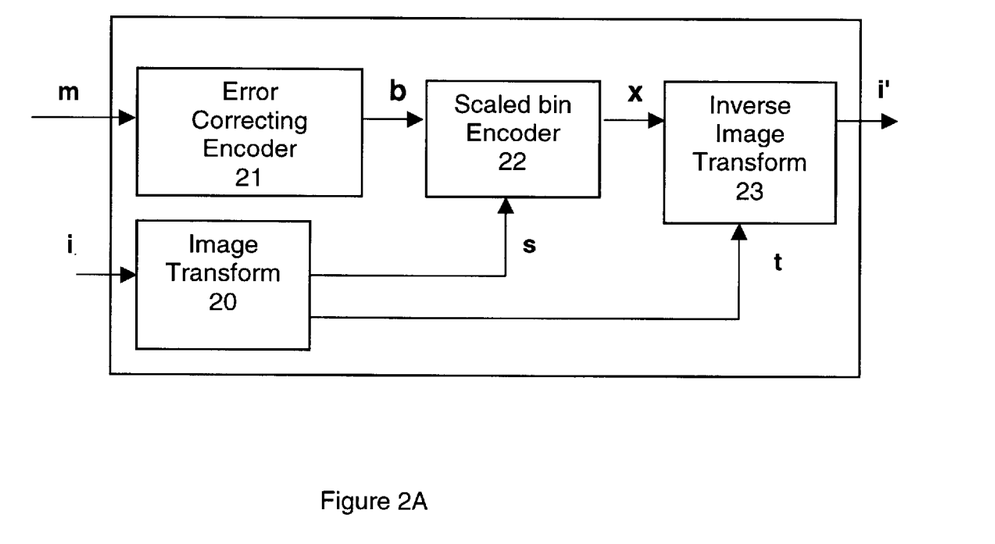
FIGS. 2A and 2B illustrate a first embodiment of a system and method of watermarking using scaled bin encoding in accordance with the present invention.

Embedding using Scaled Bin Encoding:

FIG. 2A illustrates one embodiment of a system of watermarking for embedding a watermark message into a covertext image. Embedding of the watermark message m into image data i is performed in a transform domain. The image i is initially transformed into a set of transform coefficients t=F(i) by image transform block 20. The image transform block 20 can be embodied in numerous manners as is well known in the field of digital signal processing. For instance, the image transform block may be embodied so as to convert the image into a Discrete Cosine Transform (DCT) representation or a Discrete Fourier Transform (DFT) representation. Also prior to embedding, the watermark message m is encoded into an error corrected code format b by error correcting code block 21. A sub-set of coefficients s are selected from the image coefficients t for embedding the watermark data into. The scaled bin Encoding block 22 embeds the message b into the selected image data transform coefficients s to generate watermark embedded coefficients x using a coding method in which each coefficient of the sub-set of transform coefficients is scaled with a predetermined scaling parameter which is a function of an expected noise model and an allowed distortion model; each scaled coefficient is mapped to one of a pair of skewed discrete mappings dependent on the logic state of the corresponding encoded watermark data bit to be embedded into each scaled coefficient; a difference between each scaled coefficient from its corresponding mapped and scaled coefficient is obtained; and the difference is added to its corresponding original (i.e., unscaled and unmapped) coefficient to obtain each watermark embedded transform coefficient.

The watermark embedded coefficients x replace the corresponding non-watermark embedded coefficients s and are combined with the remaining non-embedded coefficients. The resulting combined coefficients are inversely transformed by inverse image transform block 23 to generate a watermark embedded image i'.

It should be understood that, bin coding is generally defined to be a technique in which code words are chosen for encoding a given message depending on the message itself and on the image in which it is being encoded into. Scaled bin encoding, according to the system and method of the present invention, is generally defined as a technique in which an appropriate scaling parameter is introduced into a bin-coding scheme to adapt the coding rate (i.e., number of bins) to the level of noise that is expected to disrupt the transform coefficients and an allowed distortion. Thus, the scaled bin encoding based watermarking system and method in accordance with the present invention is robust to noise introduced by image processing operations and hostile attacks.

The system shown in FIG. 2A including and image transformer 20, an encoder 21, scaled bin encoder 22 and inverse image transformer 23 can be embodied in either a software implementation performed by a computing or processing system, or in a dedicated hardware implementation such as an ASIC, or any combination of a software and hardware implementation.

Figure 2B:
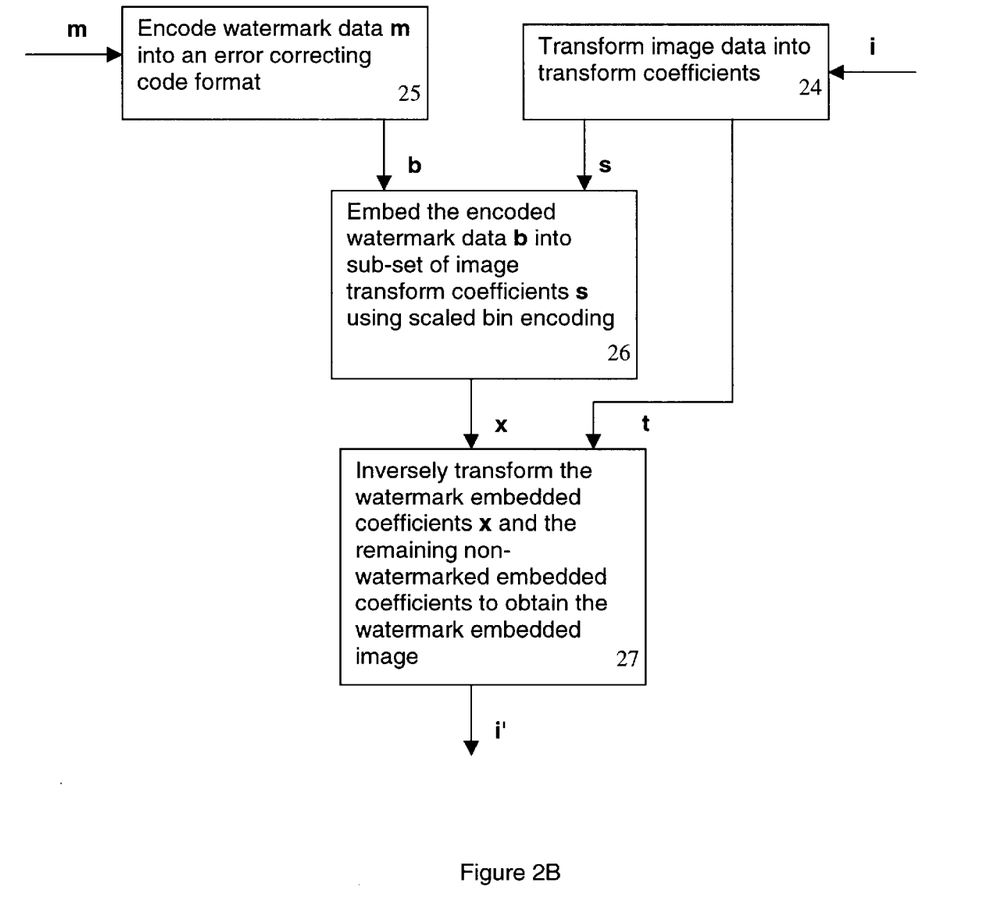

FIG. 2B illustrates an embodiment of a method of watermarking using scaled bin encoding corresponding to the system shown in FIG. 2A. The method shown in FIG. 2B includes the steps of transforming image data i into transform coefficients (step 24); encoding watermark data m into an error correcting code format to generate encoded watermark data b (step 25); embedding the encoded watermark data b into a sub-set of the transform coefficients s using scaled bin encoding (step 26); inversely transforming the watermark embedded coefficients x and the remaining non-watermark embedded coefficients to obtain a watermark embedded image i' (step 27).

It should be noted that scale bin encoding of watermark data into an image can be performed within the spatial (i.e. pixel) domain of the image instead of a given transform domain of the image. Hence, in an alternative embodiment of the system of watermarking image transform block 20 and inverse image transform block 23 (FIG. 2A) are not required and in an alternative embodiment of the method of watermarking the steps of transforming 24 and inversely transforming 27 are not required In one embodiment, embedding using scaled bin encoding is performed so as to ensure that the watermarked image is perceptually similar to the original image by adhering to the following allowed distortion model and expected noise model criteria:

1. A pair of scalar discrete mapping—$q^0$ and $q^1$ both having a scalar distortion level $|q^0(s)-s|<\tilde{D}$ and $|q^1(s)-s|<\tilde{D}$ that is compatible with the distortion constraint $d(x,s)<D$.

2. A scalar parameter $0<\alpha<1$ whose value depends on the relative power of the expected noise in the attack channel.

Hence, in accordance with another embodiment of the system and method of watermarking in which a sequence $b=(b_1, \ldots, b_N)$ of N bits is embedded into a sequence $s=(s_1, \ldots, s_N)$ of N transform coefficients, embedding is performed using scaled bin encoding by scaling the sequence s by $\alpha$ and then mapping it using a discrete mapping q defined component-wise by the sequence b such that the i-th component is mapped by $q^0$ or by $q^1$ according to the sign of $b_i$. More formally:

$$q(\alpha s)=(q^{b_1}(\alpha s_1), \ldots, q^{b_N}(\alpha s_N)).$$

Next, the difference between $\alpha s$ and its mapped version is added to the original sequence s to obtain the watermarked signal x:

$$x=s+(q(\alpha s)-\alpha s)$$

Figure 3:
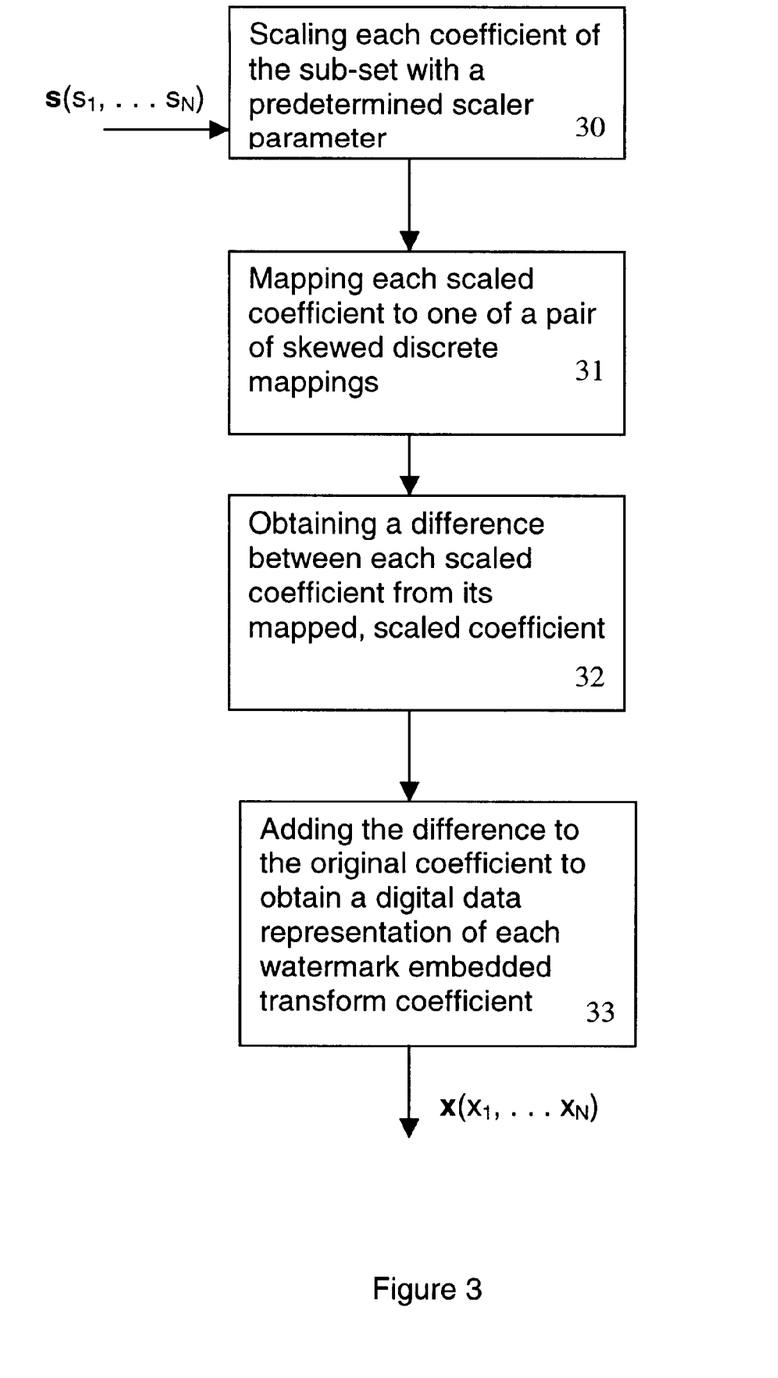
FIG. 3 illustrates a first embodiment of a method of scaled bin encoding in accordance with the present invention.

FIG. 3 shows the steps of performing scaled bin encoding using the scaling parameter $\alpha$ which is a function of an expected noise level and using discrete mappings which are a function of an allowed distortion model as defined above. According to this method, each coefficient $s_i$ of the sub-set s is scaled with the predetermined scaling parameter $\alpha$ (step 30) and are then mapped to one of a pair of skewed discrete mappings $(q^0, q^1)$ dependent on the logic state of a corresponding encoded watermark bit $b_i$ to be embedded into the scaled coefficient $s_i$ (step 31). A difference between each scaled coefficient and its corresponding mapped, scaled coefficient is determined (step 32) and the difference is added to its corresponding original (i.e., unscaled, unmapped) coefficient to obtain the digital data representation of each watermark embedded transform coefficient $x_i$ (step 33).

Decoding Using Probability Based Decoding:

In accordance with another embodiment of the system and method of watermarking, the watermark decoding stage 12 (FIG. 1) is implemented using a probability based decoding scheme which includes parametric statistical estimation procedures for estimating statistical information relating to the transform coefficients of the original image and an expected (i.e., worse case) model for the attack channel noise.

In one embodiment of the watermarking system using a probability based decoding scheme (FIG. 4A) an image transform block 40 receives the noisy image i* and transforms it into a transform representation. The type of transform performed by transform block 40 is the same type as that performed during the watermark encoding process. The image transform block 40 provides a sub-set of watermark embedded transformed coefficients y to the probability based watermark decoder 41. The sub-set of watermark embedded transformed coefficients y corresponds to the original sub-set of coefficients used during the watermark encoding process (i.e., s). The watermark decoder 41 extracts the embedded watermark data b* from the sub-set using a probability based decoding scheme. The extracted watermark data b* is provided to the error correcting code (ECC) decoder 42 which decodes the watermark data b* and outputs estimated watermark data m*.

Figure 4A:
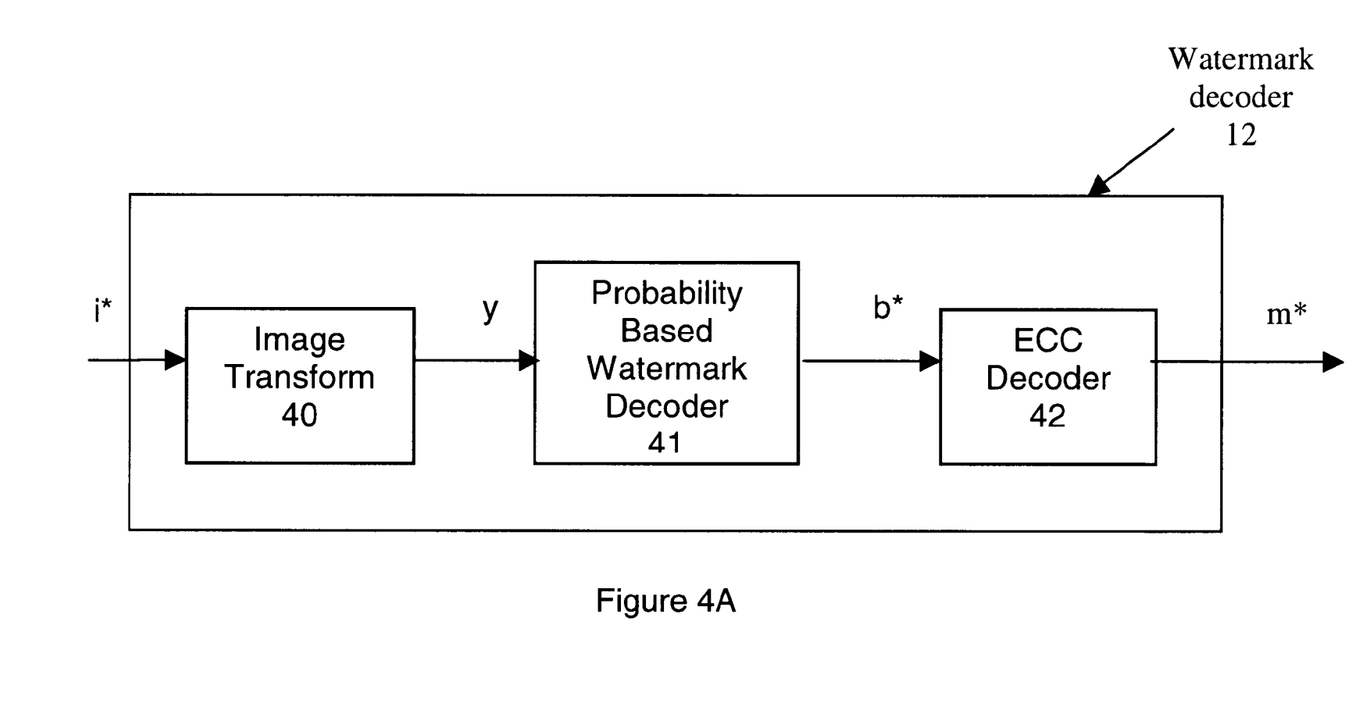
FIGS. 4A and 4B illustrate a first embodiment of a system and method of watermarking using a probability based decoding scheme.
Figure 4B:
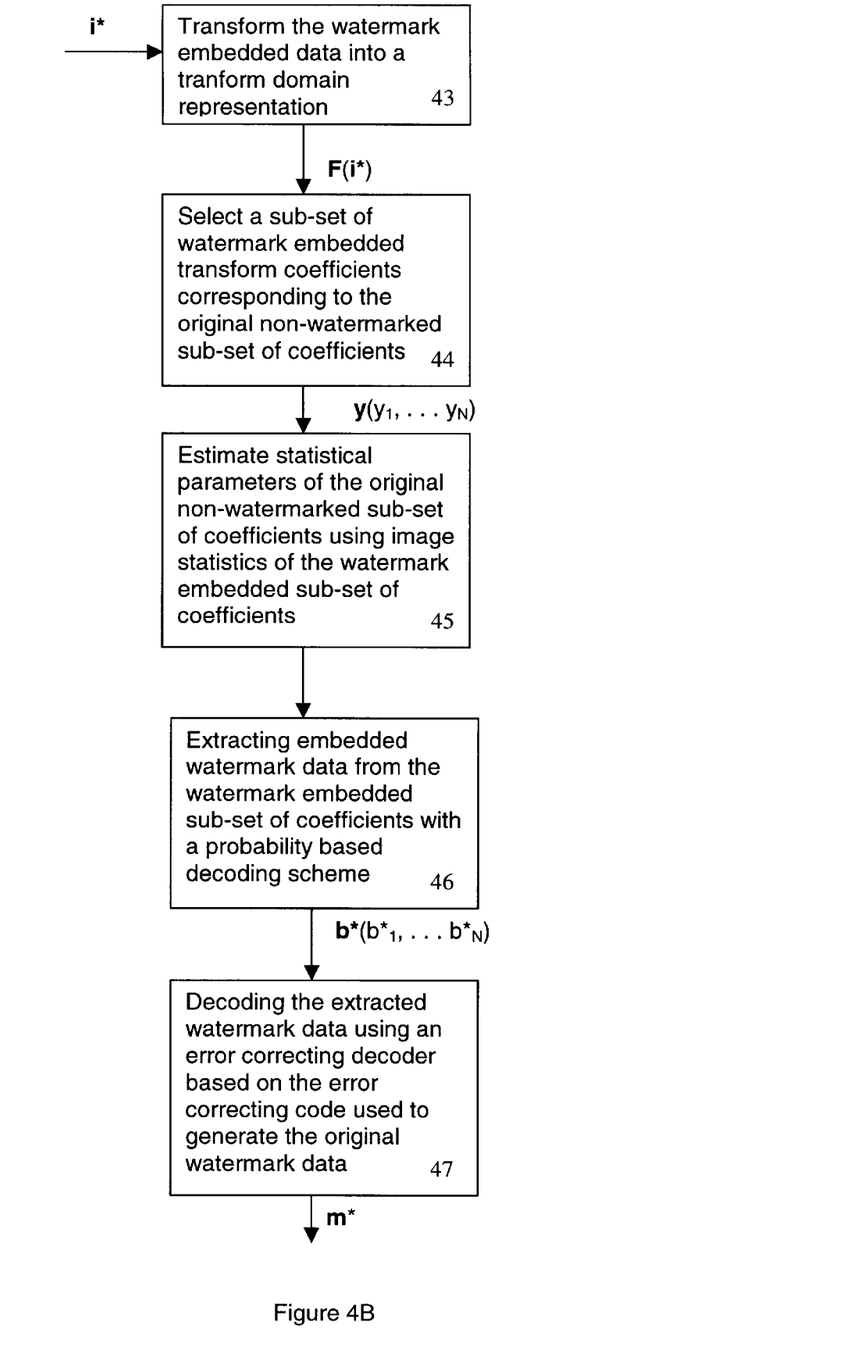

FIG. 4B shows an embodiment of the watermarking method using probability based decoding in which the encoded watermark message m is estimated from the distorted or noisy version of the image i*. Initially the noisy watermark embedded image i* is transformed into a transform domain representation F(i*) (step 43) and a second sub-set of transform coefficients is selected (step 44) having the same location in the transform domain as the first sub-set $s(s_1, \ldots, s_N)$ used in the watermark encoding process. These coefficients are denoted $y=(y_1, \ldots, y_N)$. Next, the statistical parameters of the original sub-set of coefficients $s=(s_1, \ldots, s_N)$ are estimated, by determining (step 45) the statistics of the distorted coefficients $y=(y_1, \ldots, y_N)$. The encoded watermark data word b* is extracted from y using a probability based decoding scheme which utilizes known aspects of the scaled bin encoding process including the scaling parameter, the expected noise and allowed distortion model, and the estimated statistical parameters (step 46). Once watermark data b* is determined it is decoded to obtain the estimated decoded message m* (step 47).

The system shown in FIG. 4A including and image transformer 40, watermark decoder 41 and ECC decoder 42 can be embodied in either a software implementation performed by a computing or processing system, or in a dedicated hardware implementation such as an ASIC, or any combination of a software and hardware implementation.

It should be understood that the "location" of coefficients within the transform domain refers to the location within the array of coefficients generated from the transformation. It should further be noted that the location can be a 1, 2, 3 or any multi-dimensional location depending on the dimensions of the array of coefficients generated from the transformation.

Figure 5:
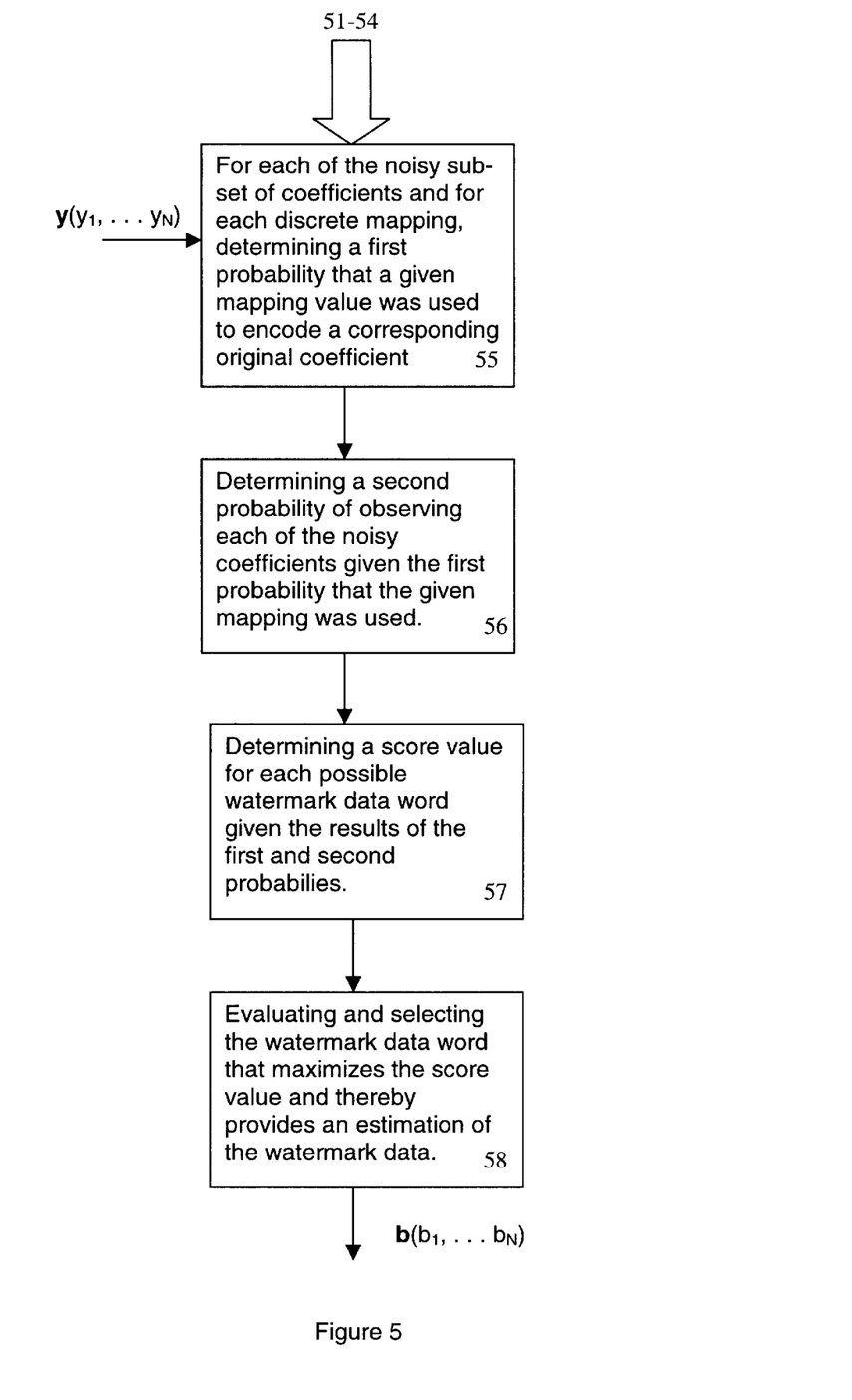
FIG. 5 illustrates an embodiment of a watermarking method in which watermark data is decoded using a probability based decoding scheme.

In one embodiment in which the probability based decoding scheme is the Maximum Likelihood (ML) decoding scheme the same parameters used by the scaled bin encoding procedure ($\alpha$, $q^0$ and $q^1$), the expected noise and allowed distortion model, and the estimated statistical parameters of the original sub-set $s(s_1, \ldots s_N)$ are used. FIG. 5 shows one embodiment of the method of the ML decoding procedure. Given the scaled bin encoding parameter 51 (i.e., $\alpha$), known aspects of the original mapping 52, and the expected noise and allowed distortion model 53 and estimated statistical parameters 54, the following probabilities are determined (steps 55 and 56):

the probability $P_0(j)$ that the point $q^0(j)$ was used in encoding the corresponding original coefficient; and the conditional probability $P_0(y_i|j)$ of observing the distorted coefficient value $y_i$ given that the point $q^0(j)$ was used in encoding the corresponding original coefficient;

the probability $P_1(j)$ that the point $q^1(j)$ was used in encoding the corresponding original coefficient; and the conditional probability $P_1(y_i|j)$ of observing the distorted coefficient value $y_i$ given that the point $q^1(j)$ was used in encoding the corresponding original coefficient;

(where j is an integer index of the discrete mapping points which ranges over a finite interval $\{-J,J\}$). Using the results of the probabilities and for each possible code word b (where b ranges over the $2^k$ possible error correcting code words) the following score is determined (step 57):

$$Sc(b) = P\{y|b\} = P\{(y_1, \ldots, y_n)|(q_1^{b_1}, \ldots, q_n^{b_n})\} = \prod_{i=1}^{n} \sum_{j=-J}^{J} P_{b_i}(y_i|j)P_{b_i}(j)$$

The scores are then evaluated and the code word b that maximizes the score Sc(b) is selected and corresponds to the estimated encoded watermark data word b* (step 58).

Figure 6A:
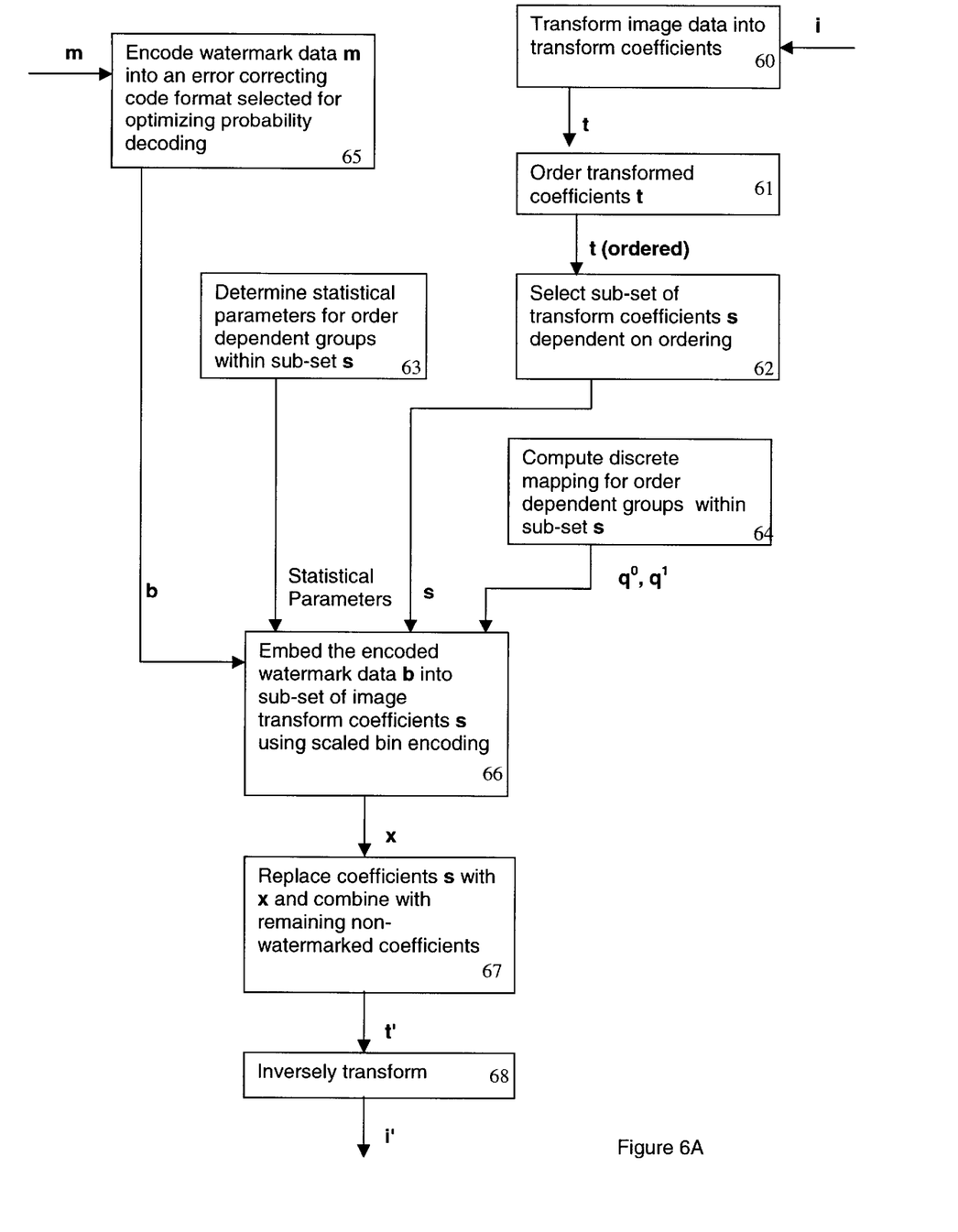
FIGS. 6A and 6B illustrate an embodiment of watermarking using scaled bin encoding and the Maximum Likelihood decoding.
Figure 6B:
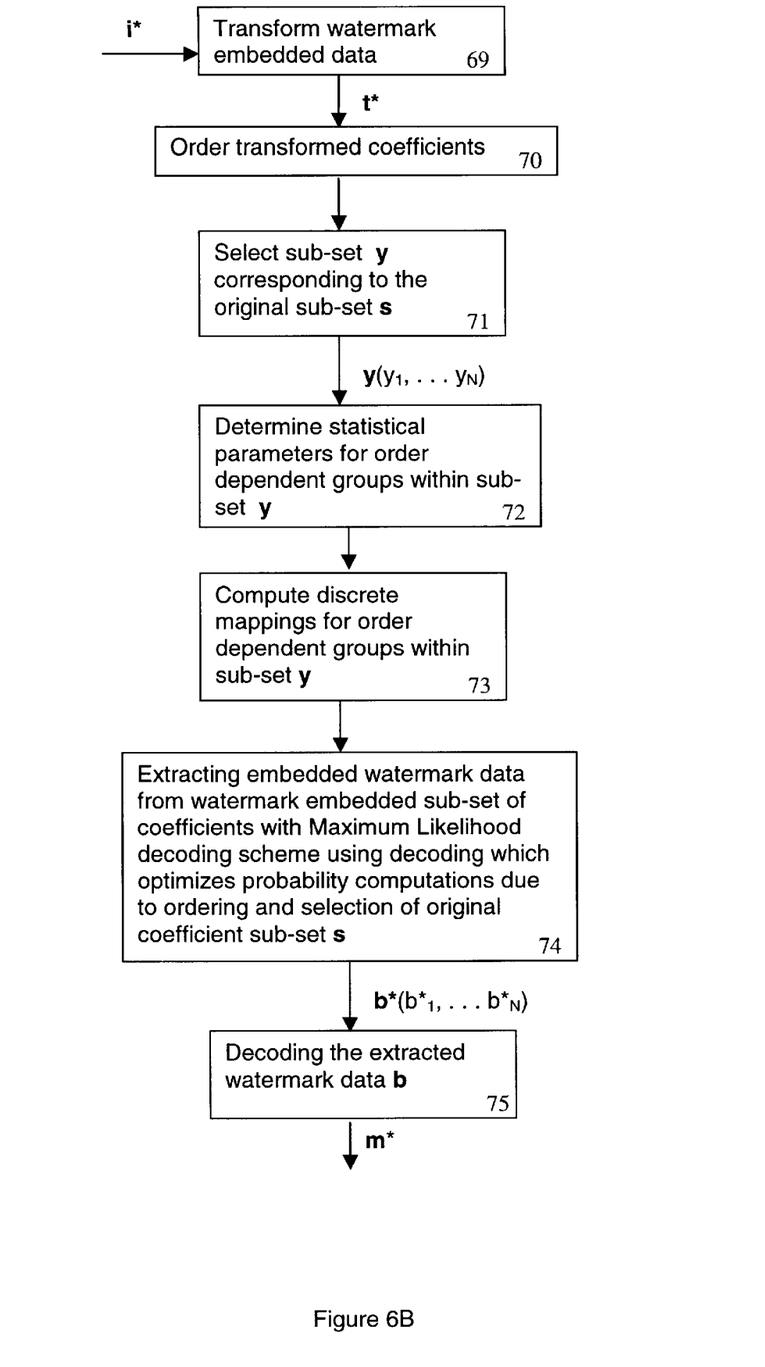

FIGS. 6A and 6B shows an embodiment of the method of watermarking using scaled bin encoding (FIG. 6A) and ML decoding (FIG. 6B) in which encoding of the watermark data is performed so as to simplify decoding when extracting the watermark data from the noisy image i*. As shown in FIG. 6A, initially the image i to be watermarked is transformed into its DCT transform representation t=DCT(i) (step 60).

Figure 6C:
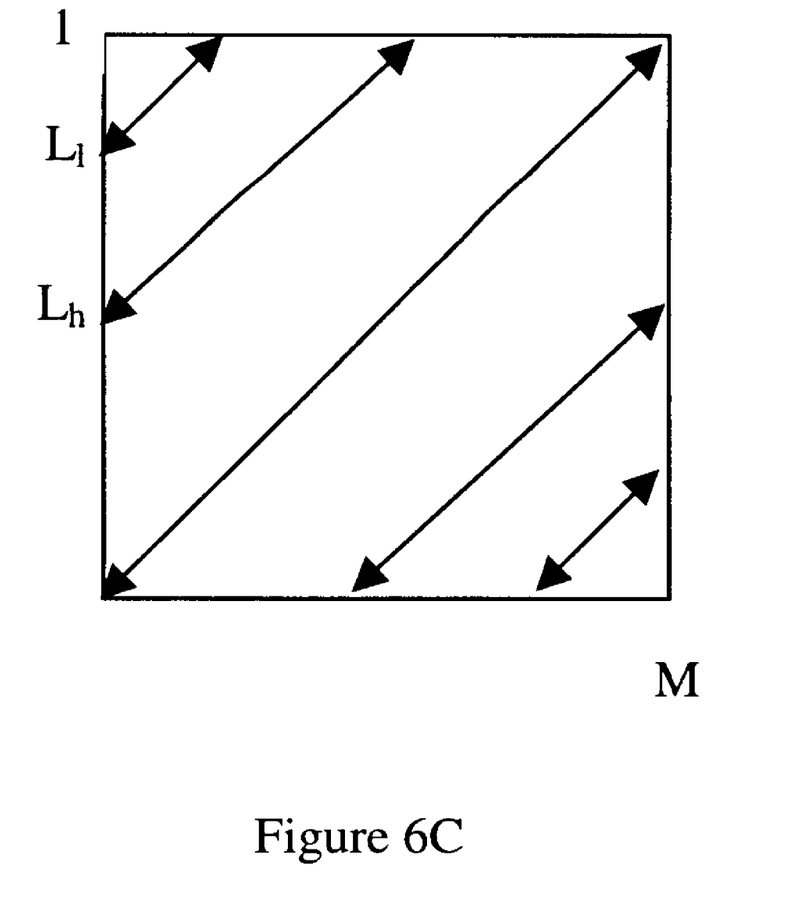
FIG. 6C illustrates ordering of DCT coefficients for selection of a sub-set of transform coefficients in accordance with the present invention.

Next, the transform coefficients are ordered (step 61) in the DCT domain according to the order of the off-diagonals starting from the top left corner (no. 1) and ending at the right bottom corner (no. M) as shown in FIG. 6C. It should be noted that the DCT domain corresponds to a frequency domain representation of the image. Referring to FIG. 6C, coefficients are ordered diagonally from the lowest frequency (i.e., DC) situated at the top left corner 1 to the highest frequency at the bottom right corner M. Each off-diagonal (e.g., $L_1$, $L_n$) represent a range of frequencies including groups (i.e., off-diagonals) of coefficients within that range.

A sub-set s of N transform coefficients is then selected (step 62) from the ordered coefficients corresponding to off-diagonals indexed from $L_1$, to $L_n$ where $1<L_1<L_n<M$. These coefficients are to be used as the covertext signal $s=(s_1, \ldots, s_N)$ in which the watermark message or data is to be encoded into. For each off-diagonal with indexes in the range $[L_1,L_n]$ a statistical parameter is computed (step 63) for the coefficients corresponding to this off-diagonal (where i is the index of the coefficient). In this case, the statistical parameter is the estimated variance Q of the set of coefficients located on the off-diagonal of the i-th coefficent. Coefficients corresponding to certain off-diagonal share the same estimated variance. The formula of the estimated variance of a set of numbers $$\{a_i\}_{i=1}^k$$

is well known in the field of statistics and is given by:

$$V = \frac{1}{K}\sum_{i=1}^{K} a_i^2 - \left(\frac{1}{K}\sum_{i=1}^{K} a_i\right)^2$$

For each off-diagonal a pair of uniform discrete mappings are computed (step 64). The discrete mappings depend on an allowed scalar distortion level. This distortion level, for the coefficient $s_i$, is defined by $D_i = \epsilon \sqrt{Q_i}$, where $\epsilon$ is a global parameter that controls the visual distortion level. This distortion term is motivated by models of the Human visual system and may be replaced by other distortion functions. It should be noted that all the coefficients corresponding to the same off-diagonal have a common distortion level $D_i$ and hence share the same discrete mappings thereby significantly reducing mapping computation. Consequently, for each distortion level parameter $D_i$ a pair of uniform scalar discrete mapping—$q^0$ and $q^1$ can be determined by the following:

$$q_{D_i}^0(x) = \left(round\left(\frac{x}{2D_i} - \frac{1}{4}\right) + \frac{1}{4}\right)2D_i \text{ and } q_{D_i}^1(x) = \left(round\left(\frac{x}{D_i} + \frac{1}{4}\right) - \frac{1}{4}\right)2D_i,$$

where round(·) returns the closest integer value to a real input.

The mappings $q_i^0, q_i^1$ take values in the discrete sets $$\left\{\left(2j + \frac{1}{2}\right)D\right\}_{j=-\infty}^{\infty}$$

and $$\left\{\left(2j - \frac{1}{2}\right)D\right\}_{j=-\infty}^{\infty},$$

respectively. We denote by $q_i^0(j)$ and $q_i^1(j)$ where j is an integer index the corresponding elements in the above mentioned discrete sets.

The watermark message m is encoded as a sequence of N bits denoted $b=(b_1, \ldots, b_N)$, using a code selected dependent on the type of transform ordering and for optimizing subsequent decoding steps (step 65). In this case, the message is encoded using Hadamard matrix rows as error correcting code words which accelerates probability computations during the ML decoding process. Each block of k message bits is mapped into the appropriate row of length $n=2^k$ of the Hadamard matrix of order k, where k might change as a function of the off-diagonal and as a function of the expected noise power. In this embodiment it is assumed that N=nR, where R is an integer.

The binary sequence $b=(b_1, \ldots, b_n)$ is embedded in the coefficient sub-set $s=(s_1, \ldots, s_n)$ using the scaled bin-coding scheme (step 66) to obtain the watermarked coefficients sequence x. The scaled bin encoding is performed for each block of n coefficients until the sub-set $s=(s_1, \ldots, s_N)$ is exhausted. Initially, the coefficients are scaled using the scaling parameter a defined by the formula:

$$\alpha = \frac{\varepsilon}{\varepsilon + \eta}$$

where $\epsilon$ is defined as above and $\eta$ is the ratio between the expected (i.e., worst case) noise power and the covertext signal power. The ratio parameter $\eta$ is determined experimentally by measuring its value for many images and various noise types. The stronger the noise the higher the value of $\eta$. The maximum level of noise is chosen by determining how robust the watermarking scheme needs to be, and the corresponding value of $\eta$ is determined. It should be noted that in another embodiment, the parameter $\alpha$ may depend on the index i and hence is not fixed. The scaled coefficients are then mapped using the vector discrete mappings $q_{D_n}$ (determined in step 64) as defined by the following:

$$q(\alpha s) = (q_{D_1}^{b_1}(\alpha s_1), \ldots, q_{D_n}^{b_n}(\alpha s_n))$$

Next, the difference between as and its mapped version is subtracted from the original sequence s to obtain the watermarked signal x:

$$x = s + (q(\alpha s) - \alpha s)$$

The coefficient sequence s in the DCT representation t are replaced with the watermarked coefficient sequence x and the resulting watermarked transform representation is denoted by t' (step 67). The watermarked DCT domain representation is then inversely transformed (step 68) to obtain the watermarked image $i' = DCT^{-1}(t')$.

Referring to FIG. 6B, the decoder receives the watermark image i' after it has been exposed to some form of intentional and/or unintentional noise resulting in a distorted or noisy version of the image denoted i*. The decoder extracts by estimation the embedded watermark data given the noisy image i* using Maximum Likelihood decodig. initialy, the DCT transform of the noisy image i* is determined and denoted $t^* = DCT(i^*)$ (step 690). Nest, the transorm coeffcients t* of the noisy image are ordered in the same manner as ordered for the scaled bin encoding process (step 70). In this case, the coefficients are ordered to off-diagonals starting from the top left corner (no. 1) and ending at the right bottom corner (no. M). Once the coefficients are ordered, a subset $y = (y_1 \ldots y_N)$ of N transform coefficients is selected (step 71) corresponding to the original sub-set s (i.e., off diagonals indexed from $L_1$ to $L_h$ where $1 < L_1 < L_h < M$).

In accordance with the method of the present invention, it is assumed that the distorted image i* is visually similar to the original image i, such that the statistical parameters of the original watermarked sub-set can be estimated by determining the statistical parameters (e.g., the variance estimations $Q_i^*$) for the noisy version coefficients y. The statistical parameter, $Q_i^*$ is determined (step 72) for groups (i.e., off-diagonals) within the sub-set y in the same manner as determined for sub-set s.

A pair of uniform discrete mappings $q^{0*}$ and $q^{1*}$ are then computed for each off-diagonal in the same manner as computed for the scaled bin encoding process (step 73).

Once the statistical parameters of the watermarked sub-set is determined, the encoded watermark data b* is extracted using Maximum Likelihood decoding (step 74). Specifically, for each observation $y_i$, estimate the probabilities $P_0(y_i|j)$ and $P_1(y_i|j)$ of observing the value $y_i$ given that the points $q_i^{0*}(j)$ and $q_i^{1*}(j)$, respectively, were used to encode the corresponding original coefficient $s_i$. Using an independent Gaussain model for the joint distribution of the DCT coefficients, the allowed watermark distortion and the expected noise in the attack channel, these probabilities are given by:

$$P_b(y_i \mid j) = \frac{1}{\sqrt{2\pi}\,\sigma_i} \exp\{-(y - \beta q_i^b * (j))^2 / \sigma_i^2\},$$

$$\beta = \frac{1+\varepsilon+\eta}{\alpha+\varepsilon+\eta} \text{ and } \sigma_i^2 = Q_i * (1+\varepsilon+\eta-\beta^2(\alpha^2+\varepsilon)).$$

The a-priori probabilities $P_0(j)$ and $P_1(j)$ of using the corresponding points $q_i^{0*}(j)$ and $q_i^{1*}(j)$ in encoding the corresponding original coefficient $s_i$ are independent of $y_i$ and can be estimated by:

$$P_b(j) = \frac{1}{\sqrt{2\pi Q_i *}} \exp\{(q_i^b * (j))^2 / Q_i *\}$$

For each Hadamard code word b (where b ranges over the $2^k$ possible error correcting code words) the following score is computed:

$$Sc(b) =$$

$$P\{y \mid b\} = P\{(y_1, \ldots, y_n) \mid (q_1^{b_1}, \ldots, q_n^{b_n})\} = \prod_{i=1}^{n} \sum_{j=-J}^{J} P_{b_i}(y_i \mid j) P_{b_i}(j),$$

where J is chosen in such a way that the difference $$\sum_{j=-\infty}^{\infty} P_b(y_i \mid j) P_{b_i}(j) - \sum_{j=-J}^{J} P_b(y_i \mid j) P_{b_i}(j)$$

is negligible for every i and for b∈{0,1}. It should be noted that the above defined score function is efficiently computed using a fast Hadamard transform. Hence, watermark decoding is improved by ordering and selecting off-diagonal coefficients during watermark encoding so as to facilitate probability computation using a fast Hadamard transform.

A set of scores is computed for all of the Hadamard code words. The code word b that maximizes the score function is the estimated watermarked code word b*. The watermark code word b* is decoded using the indices of the Hadamard matrix rows to obtain the estimated decoded message m* (step 75). It should be noted that according to the method shown in FIGS. 6A and 6B coefficients are ordered and selected according to an off-diagonal ordering to facilitate simplification of the determination of Sc(b) using Hadamard decoding however it should be further noted that the watermarking technique can be optimized similarly using other transform orderings paired with other decoding schemes in order to minimized probability computations performed during ML decoding.

In the preceding description, numerous specific details are set forth, such as specific transform, encoding, decoding, and ordering types in order to provide a through understanding of the present invention. It will be apparent, however, to one skilled in the art that these specific details need not be employed to practice the present invention. In other instances, well-known image processing steps have not been described in detail in order to avoid unnecessarily obscuring the present invention.

In addition, although element of the present invention have been described in conjunction with a certain embodiment, it is appreciated that the invention can be implement in a variety of other ways. Consequently, it is to be understood that the particular embodiment shown and described by way of illustration is in no way intended to be considered limiting. Reference to the details of this embodiment is not intended to limit the scope of the claims which themselves recited only those features regarded as essential to the invention.

We claim:

1. A method of watermarking digital image data having an associated domain representation comprising the steps of:

encoding watermark data using an error correcting code to generate encoded watermark data;

transforming the digital image data from a spatial domain representation into a transform domain representation;

embedding the encoded watermark data into a first sub-set of elements of a domain representation of the image to generate an embedded sub-set of the domain representation using scaled bin encoding by scaling each element of the sub-set of the domain representation of the image with a scaling parameter which is representative of the statistics of the image data, an expected noise level and an allowed distortion model;

mapping each scaled element to one of a pair of skewed discrete mappings dependent on the logic state of a corresponding encoded watermark data bit to be embedded into each scaled element;

obtaining a difference between each scaled element from its corresponding original element; and adding the difference to its corresponding original element to obtain each watermark embedded element;

combining the embedded sub-set of elements with the remaining unembedded portion of elements of the domain representation of the image to generate a watermark embedded domain representation of the image;

inversely transforming the watermark embedded domain representation of the image to generate a spatial domain representation of the watermarked digital image which includes the digital image data and the watermark data.

2. The method of watermarking as described in claim 1 further comprising the step of recapturing the watermark from a noisy version of the watermark embedded spatial domain representation of the image:

transforming the spatial domain representation of the noisy watermark embedded image into the transform domain representation;

selecting a second sub-set of elements from the noisy watermarked embedded transform domain representation of the image which corresponds to the first sub-set of elements;

determining statistical parameters of the second sub-set of elements;

extracting embedded watermark coded data from the second sub-set of elements with a probability based decoding scheme which uses the statistical parameters, an expected noise and allowed distortion model and a scaling parameter associated with the step of scaled bin encoding;

decoding the extracted watermark coded data using an error correcting decoder based on the error correcting code to generate the watermark data.

3. The method of watermark ng as described in claim 2 wherein the step of extracting embedded watermark data further comprises the steps of:

1) for each of the second sub-set of elements and for each discrete mapping determining:
   a) a first probability that a given mapping value was used to encode a corresponding original element within the first sub-set of elements;
   b) a second probability of observing each element of the second sub-set of elements given the first probability that the given mapping value was used;
2) determining a score value for each possible watermark data code word determined from the first and second probabilities;
3) selecting the watermark code data word that maximizes the score value and thereby provides an estimation of the watermark data.

4. The method of watermarking as described in claim 3 wherein the transform domain representation corresponds to DCT transform domain having associated coefficients.

5. The method of watermarking as described in claim 4 further comprising the step of ordering the first sub-set of transform coefficients in the DCT domain representation according to the order of off-diagonals and selecting the first sub-set of transform coefficients corresponding to off diagonals wherein groups of the first sub-set of transform coefficients have common distortion and variance characteristics.

6. The method as described in claim 5 further comprising the step of ordering the transform domain representation coefficients prior to selection of the second sub-set of coefficients wherein the second sub-set of coefficients have the same transform domain location as the first sub-set of coefficients.

7. The method as described in claim 6 wherein the step of extracting the watermark coded data using Hadamard decoding.

8. A system of watermarking digital image data comprising:
   a means for transforming the digital image data into a transform domain representation to generate first transform coefficients;
   a means for encoding watermark data using an error correcting code to generate encoded watermark data;
   a means for embedding the encoded watermark data into a first sub-set of the first transform coefficients to generate a sub-set of embedded transform coefficients by using scaled bin encoding;
   a means for inversely transforming the watermark embedded first sub-set of coefficients along with non-watermark embedded first transform coefficients to generate watermarked digital image data which includes the digital image data and the watermark data;
   a means for transforming the watermarked image data into the transform domain representation of second transform coefficients;
   a means for selecting a second sub-set of the second transform coefficients which correspond to the first sub-set of transform coefficients;
   a means for estimating statistical parameters of the first sub-set of transform coefficients using image statistics of the second sub-set of coefficients;
   a means for extracting embedded watermark data from the second sub-set of coefficients with a probability based decoding scheme which uses the predetermined scaling parameter, known aspects of the scaling and mapping steps, the noise and distortion model, and the estimated statistical parameters;
   a means for decoding the extracted watermark data using an error correcting decoder based on the error correcting code to generate the watermark data.

9. The system as described in claim 8 being implemented using one of a software implementation, hardware implementation, and a combination of software and hardware implementations.

10. The system as described in claim 8 wherein the means for encoding is a Hadamard encoder.

11. The system as described in claim 8 wherein the means for decoding is a Maximum likelihood decoder.

12. A system of watermarking digital image data comprising:
   a first digital image processor for:
      transforming the digital image data into a transform domain representation to generate first transform coefficients;
      encoding watermark data using an error correcting code to generate encoded watermark data;
      embedding the encoded watermark data into a first sub-set of the first transform coefficients to generate a sub-set of embedded transform coefficients by using scaled bin encoding; and
      inversely transforming the watermark embedded first sub-set of coefficients along with non-watermark embedded first transform coefficients to generate watermarked digital image data which includes the digital image data and the watermark data; and
   a second digital image processor for:
      transforming the watermarked image data into the transform domain representation of second transform coefficients;
      selecting a second sub-set of the second transform coefficients which correspond to the first sub-set of transform coefficients;
      estimating statistical parameters of the first sub-set of transform coefficients using image statistics of the second sub-set of coefficients;
      extracting embedded watermark data from the second sub-set of coefficients with a probability based decoding scheme which uses the predetermined scaling parameter, known aspects of the scaling and mapping steps, the noise and distortion model, and the estimated statistical parameters; and
      decoding the extracted watermark data using an error correcting decoder based on the error correcting code to generate the watermark data.

13. A method of watermarking digital image data having an associated domain representation comprising the steps of:
   encoding watermark data using an error correcting code to generate encoded watermark data;
   transforming the digital image data from a spatial domain representation into a transform domain representation;
   embedding the encoded watermark data into a first sub-set of elements of a domain representation of the image to generate an embedded sub-set of the domain representation by scaling each element of the sub-set with a scaling parameter that is representative of the expected noise level and an allowed distortion model;
   combining the embedded sub-set of elements with the remaining unembedded portion of elements of the domain representation of the image to generate a watermark embedded domain representation of the image.

14. A system of watermarking digital image data comprising:
   a means for transforming the digital image data into a transform domain representation to generate first transform coefficients;

transforming the digital image data from a spatial domain representation into a transform domain representation;

a means for encoding watermark data using an error correcting code to generate encoded watermark data;

a means for embedding the encoded watermark data into a first sub-set of the first transform coefficients to generate a sub-set of embedded transform coefficients by scaling each element of the sub-set with a scaling parameter that is representative of the expected noise level and an allowed distortion model.

* * * * *